(12) United States Patent
Wohl et al.

(10) Patent No.: US 11,649,337 B2
(45) Date of Patent: May 16, 2023

(54) RECYCLE FEEDSTOCKS FOR ON-DEMAND ARTICLE MANUFACTURING

(71) Applicant: UNITED STATES OF AMERICA AS REPRESENTED BY THE ADMINISTRATOR OF NASA, Washington, DC (US)

(72) Inventors: Christopher J Wohl, Suffolk, VA (US); Samantha I Applin, Hampton, VA (US); Hannes Schniepp, Williamsburg, VA (US); Bryce L Horvath, Virginia Beach, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 529 days.

(21) Appl. No.: 16/831,163

(22) Filed: Mar. 26, 2020

(65) Prior Publication Data

US 2020/0308365 A1    Oct. 1, 2020

Related U.S. Application Data

(60) Provisional application No. 62/823,904, filed on Mar. 26, 2019.

(51) Int. Cl.
*C08J 11/12*    (2006.01)
*C08F 290/06*    (2006.01)

(52) U.S. Cl.
CPC ........... *C08J 11/12* (2013.01); *C08F 290/064* (2013.01); *C08F 2810/20* (2013.01); *C08F 2810/30* (2013.01); *C08J 2363/00* (2013.01); *C08J 2379/08* (2013.01)

(58) Field of Classification Search
CPC .... C08J 11/12; C08J 2363/00; C08J 2379/08; C08F 290/064; C08F 2810/20; C08F 2810/30
USPC .......................................................... 521/40
See application file for complete search history.

(56) References Cited

FOREIGN PATENT DOCUMENTS

| CN | 104194038 A | * | 12/2014 |
| CN | 104804163 A | * | 7/2015 |

OTHER PUBLICATIONS

Xu et al."Recyclable biobased materials based on Diels-Alder cycloaddition",Journal of Applied Polymer Science, (2019), 136(18), pp. 47352-47362. (Year: 2019).*

(Continued)

*Primary Examiner* — Michael M. Bernshteyn
(74) *Attorney, Agent, or Firm* — Jennifer L. Riley; Robin W. Edwards; Trenton J. Roche

(57) ABSTRACT

A method of recycling a polymer structure includes converting a first polymer structure into feedstock. The first polymer structure comprises particles that are bonded to one another by chemical click bonds to form a first shape. The first polymer structure is converted into feedstock particles by breaking the click bonds. The feedstock particles are formed into a second shape, and the feedstock particles are chemically click-bonded together to form a second polymer structure having a second shape. Breaking the click bonds may include heating the particles. The structures may be formed by causing first particles having dienes to chemically bond to dienophiles of second particles.

19 Claims, 8 Drawing Sheets

(56) References Cited

OTHER PUBLICATIONS

Fan et al. "Recyclable Diels-Alder Furan/Maleimide Polymer Networks with Shape Memory Effect", ACS (2014), online (Search Report, pp. 73-79) (dated 2014).*
Costanzo et al., "Thermoresponsive, Optically Active Films Based on Diels-Alder Chemistry," Chemistry of Materials, 2007, pp. 6168-6173, vol. 19, No. 25.
Fay et al., "Molecularly oriented films for Space Applications," High Performance Polyers, 1999, pp. 145-156, Hampton, Virginia.
Owens et al., "Systems Analysis of In-Space Manufacturing Applications for the International Space Station and the Evolvable Mars Campaign," AIAA Space, 2016, pp. 1-18, Long Beach, CA.
Polaske et a., "Thermally Reversible Dendronized Linear AB Step-Polymers via "Click" Chemistry," Macromolecules, 2011, pp. 3203-3210, ACS Publications.
Wohl, et al., "Synthesis, characterization, topographical modification, and surface properties of copoly(imide siloxane)s," High Performance Polymers, 2012, pp. 40-49, vol. 24(1), Hampton, Virginia.
Traina et al., "Synthesis of cross-linked epoxy microparticles: Effect of the synthesis parameters," Journal of Colloid and Interface Science, 2012, pp. 158-164, Issue 368.
Hseih et al., "Preparation of crosslinked epoxy microparticles via phase inversion," Journal of Polymer Science Part B: Polymer Physics, 1996, pp. 2591-2598, vol. 34, John Wiley and Sons Inc.
Tsujioka et al., "Well-controlled 3Dskeletal epoxy-based monoliths obtained by polymerization induced phase separation," Journal of Polymer Science Part A: Polymer Chemistry, 2008, pp. 3272-3281, vol. 46.
Diels-Alder reaction, https://en.wikipedia.org/wiki/Diels-Alder_reaction, Jul. 23, 2018, pp. 1-17, retrieved May 11, 2020.
Maramandansubu, "Voids in crystals," retrieved from https://www.slideshare.net/Maramandansubu/voids-in-crystals, Jun. 16, 2013, pp. 1-26.
Ghosh, M. K., et al, "Polyimides: Fundamentals and applications," 1996, p. 10, Table 1, Marcel Dekker, Inc., New York.
Hunt, et al., "Superlattice formation in mixtures of hard-sphere colloids," Physical Review E, Jul. 2000, pp. 900-913, vol. 62, No. 1.
Panayiotopoulous, "Packing of sands—A review," Soil and Tillage Research, 1989, pp. 101-121, vol. 13.
Diakoumakos et al. "Heat-resistant resins derived from cyano-substituted Diels-Alder polymers," European Polymer Journal, 1993, pp. 465-472, vol. 30, No. 4.
Hynninen, et al., "Stability of LS and L52 crystal structures in binary mixtures of hard and charged spheres," The Journal of Chemical Physics, 2009, pp. 1-10, vol. 131.
Loa, et al., "Crystal structure and lattice dynamics of AlB2 under pressure and implications for MgB2," Phys. Rev. B, 2002, pp. 1-3, vol. 66 Issue 13.
Zaikov, G. E., et al., "Polymer aging at the cutting edge," 2002, p. 13, Table 2, 2002, Nova Science Publishers, Inc., New York.
Dewick, P. M., "Essentials of organic chemistry: For students of pharmacy, medicinal chemistry and biological chemistry," 2012, p. 145, John Wiley & Sons, Inc.
Kalopissis, "Structure-activity relationships of aromatic diamines in the Ames *Salmonella typhimurium* assay. Part II," Mutation Research/Fundamental and Molecular Mechanisms of Mutagenesis, 1992, pp. 9-26, vol. 269, Issue 1.
Carfagna et al., "Reactive microspheres as active fillers for epoxy resins," Journal of Applied Polymer Science, 2004, pp. 2031-2044.
Woo et al., "Morphology development in epoxy/polymer systems: Thermosetting epoxy micro particles with a thermoplastic shell," Polymer, 1998, pp. 7-13, Elsevier Science Ltd.
Koning et al., "Influence of polymerization conditions on melt crystallization of partially aliphatic polyimides," Polymer, 1998, pp. 3697-3702, Elsevier Science Ltd.
Hibino et al., "Epoxy resin particles. I. Spontaneous particle formation by the polymerization reaction of epoxy resin in a stationary system using polyethers as organic media," Colloid & Polymer Science, 2000, pp. 565-570, vol. 278, Springer-Verlag.
Palmer et al., "Ghost Particles Effect of Constrained Space on Glassy Polymer Network Formation and Mechanics," The Composites and Advanced Materials Expo, Conference Proceedings, 2017, pp. 1-6.
Yu, et al., "Crosslinked epoxy microspheres: Preparation, surface-initiated polymerization, and use as macroporous silica porogen," Journal of Applied Polymer Science, 2012, pp. 1-25, vol. 128, Issue 5.
Costa et al., "Influence of aromatic amine hardeners in the cure kinetics of an epoxy resin used in advanced composites," Materials Research, 2005, pp. 65-70, vol. 8, No. 1.
Min et al., "Cure kinetics of elementary reactions of a diglycidyl ether of bisphenol A/diaminodiphenylsulfone epoxy resin: 2. Conversion versus time," Polymer, 1993, pp. 4488-4495.
Acitelli et al., "Kinetics of epoxy cure: (1) The system bisphenoi-A diglycidyl ether/m-phenylene diamine," Polymer, 1970, pp. 335-343.
The Engineering Tool Box, "Amines, diamines and cyclic organic nitrogen compounds—pKa values," 200 retrieved from https://www.engineeringtoolbox.com, 2001, pp. 1-6, accessed Dec. 14, 2022.

* cited by examiner

RECYCLE FEEDSTOCKS FOR ON-DEMAND ARTICLE MANUFACTURING

CROSS-REFERENCE TO RELATED PATENT APPLICATION(S)

This application claims the benefit of and priority to U.S. Provisional Patent Application No. 62/823,904, filed on Mar. 26, 2019, titled "RECYCLABLE FEEDSTOCKS FOR ON-DEMAND ARTICLE MANUFACTURING," the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Various polymer structures have been developed. Some polymer structures can be recycled, but the recycling may present drawbacks.

BRIEF SUMMARY OF THE INVENTION

One aspect of the present disclosure is a method of recycling a structure comprised of polymeric materials. The method includes converting a first polymer structure comprising particles that are bonded to one another by chemical click bonds to form a first shape into feedstock particles by breaking the click bonds. The feedstock particles are formed into a second shape, and the feedstock particles are chemically click-bonded together to form a second polymer structure having a second shape. Breaking the click bonds may optionally include heating the particles. The first structure may optionally be formed by causing first particles having dienes to chemically bond to dienophiles of second particles. The method may optionally include forming epoxy particles having surfaces, and first polymers comprising dienes may be chemically bonded to the surfaces of the epoxy particles to form the first particles. Second polymers comprising dienophiles may, optionally, be chemically bonded to the surfaces of epoxy particles to form the second particles. The first and second polymers may optionally comprise polymer chemistries amenable to reaction with chemical functionalities present on the epoxy particle surface. These polymer chemistries may include, but are not limited to: polyimides, polyureas, polyurethanes, polycarbonates, polymers generated from ring-opening polymerization via either oxirane or cyclic esters, among others. The polymers may, optionally, be synthesized in solution with the epoxy particles whereby the polymers chemically bond to the epoxy particles. The first and second polymers may, optionally, be synthesized separately and mixed together after synthesis to form a particle mixture comprising first and second particles. The epoxy particles may optionally have an amine-enriched surface that chemically bonds to the polymer molecules.

The first polymer structure may, optionally, be formed by heating the particle mixture to a temperature that is sufficiently high to break click bonds between the first and second particles, followed by forming the particle mixture to a predefined shape, followed by cooling the formed particle mixture to cause click bonding of the first and second particles. The particle mixture may be heated to a temperature that is greater than a glass transition temperature of the first and second polymers, but below a melting temperature of the first and second polymers. The first and second particles of the first polymer structure may form a cubic lattice structure, or a random lattice structure.

The method may include determining a desired lattice structure, and forming the first and second particles to have first and second sizes providing a size ratio of the desired lattice structure. Examples of particle packing concepts include sodium chloride crystals and cesium chloride crystals, and the size ratio may be about 0.41 or about 0.73.

Another aspect of the present disclosure is a recyclable polymer structure including a plurality of first polymer particles having a first chemical click bonding functionality, and a plurality of second polymer particles having a second chemical click bonding functionality. The first and second polymer particles are click-bonded together to form a substantially rigid structure that can be converted to feedstock by releasing the click bonds. The first particles optionally comprise dienes, and the second particles optionally comprise dienophiles that are chemically bonded to the dienes. The first and second particles optionally comprise polyimide shells bonded to epoxy cores.

Another aspect of the present disclosure is a method of making a recyclable polymer structure. The method includes forming first polymer particles having an exterior surface with a first click-bonding functionality. The method further includes forming second polymer particles having an exterior surface with a second click-bonding functionality. The first and second polymer particles are mixed to form a particle mixture. The particle mixture is formed into a desired shape while the first polymer particles are not click-bonded to the second polymer particles. The method further includes causing the first polymer particles to click bond to the second polymer particles to form a structure having the desired shape.

The method optionally includes forming epoxy particles having amine-enriched outer surface. First polymer particles may be formed by synthesizing a first polymer having dienes in a solution with at least some of the epoxy particles. The method may include forming second polymer particles by synthesizing a second polymer dienophiles in a solution with at least some of the epoxy particles. The method may further include forming the particle into the desired shape while the particle mixture is heated to release the click bonds, followed by cooling the particle mixture to activate the click bonds.

These and other features, advantages, and objects of the present invention will be further understood and appreciated by those skilled in the art by reference to the following specification, claims, and appended drawings.

DETAILED DESCRIPTION OF THE INVENTION

Figure 1:
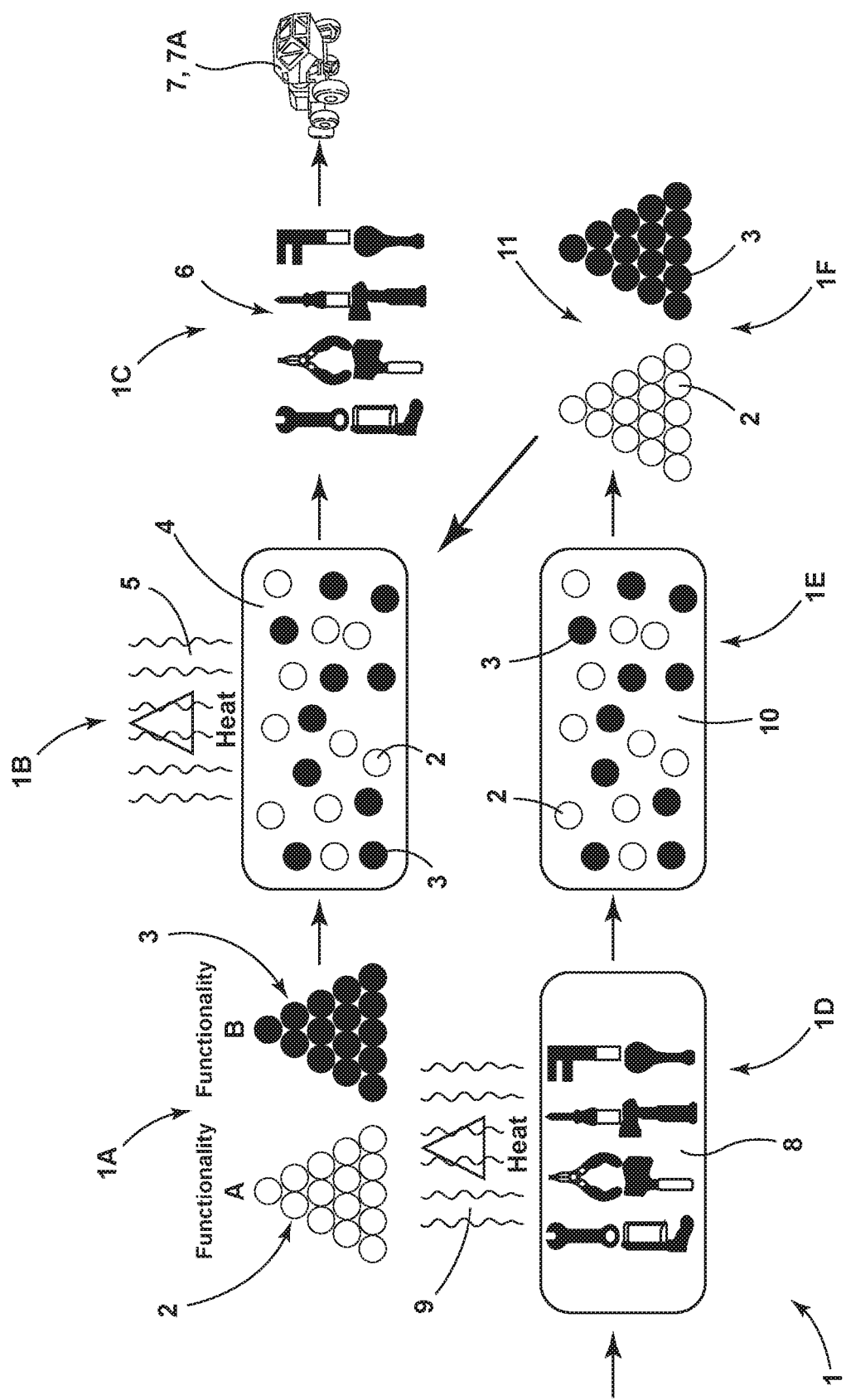
FIG. 1 is schematic view showing use of a reversibly assembly polymer system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a process 1 according to one aspect of the present disclosure includes forming a plurality of first particles 2 having a first chemical click functionality, and a plurality of second polymer particles 3 having a second click functionality at step 1A. At step 1B, a particle mixture 4 including first and second particles 2 and 3 may be formed, and heat 5 may be applied to release the click bonds. A forming step 1C may be performed to shape the heated particle mixture 4 into a first desired shape such as structure 7. The forming step 6 may comprise use of tools 6, which may comprise a mold, a 3D printer that utilizes a heated slurry, including mixture 4, or other suitable tool as required for a particular application. As discussed in more detail below in connection with FIG. 8, the structure 7 formed at step 6 may have a specific crystal structure as required for a particular application. It will be understood that the shape of the polymer structure 7 may vary as required for a particular application. In general, the polymer structure 7 may have virtually any shape.

To recycle the polymer structure 7, the structure 7 may (optionally) be broken apart at step 10 utilizing tools 8 while heat 9 is applied to release the click bonding between the first polymer particles 2 and second polymer particles 3. It will be understood that virtually any type of suitable tools may be utilized at step 10. Step 10 produces a mixture 10 of first particles 2 and second particles 3 that are not click-bonded. The first and second particles 2 and 3, respectively, may be separated to form feedstock 11 at step 1F. The process may then return to step 1B, and particles 2 and 3 may then be utilized to form a mixture 4 while heat 5 is applied. The mixture 4 may be formed into a second polymer structure 7A utilizing tooling 6. It will be understood that the recycled structure 7A may have a substantially different shape than the original polymer structure 7. In general, the first and second polymer particles 2 and 3 may be utilized to form structure 7 as required, and the structure 7 may be broken apart by releasing the click bonds to form new structures in repeated cycles. Also, the tooling 6 used to form second polymer structure 7A and/or additional polymer structures may be configured as required to form new polymer structures. For example, tool 6 may comprise a reconfigurable mold tool having pins that operably connect to powered actuators whereby the shape of the mold can be varied utilizing a digital data file.

Although the present disclosure is not limited to any particular application, it is anticipated that the recyclable polymer materials and processes may be utilized in, for example, long-duration extraterrestrial exploration where access to raw material will be important for mission success. For example, the first polymer structure 7 may comprise a portion of the spacecraft that may be used once for a first purpose, and the structure 7 may be recycled and reformed into a second structure during the mission. The materials may be reconfigured numerous times as required to provide any number of new polymer structures.

Figure 2:
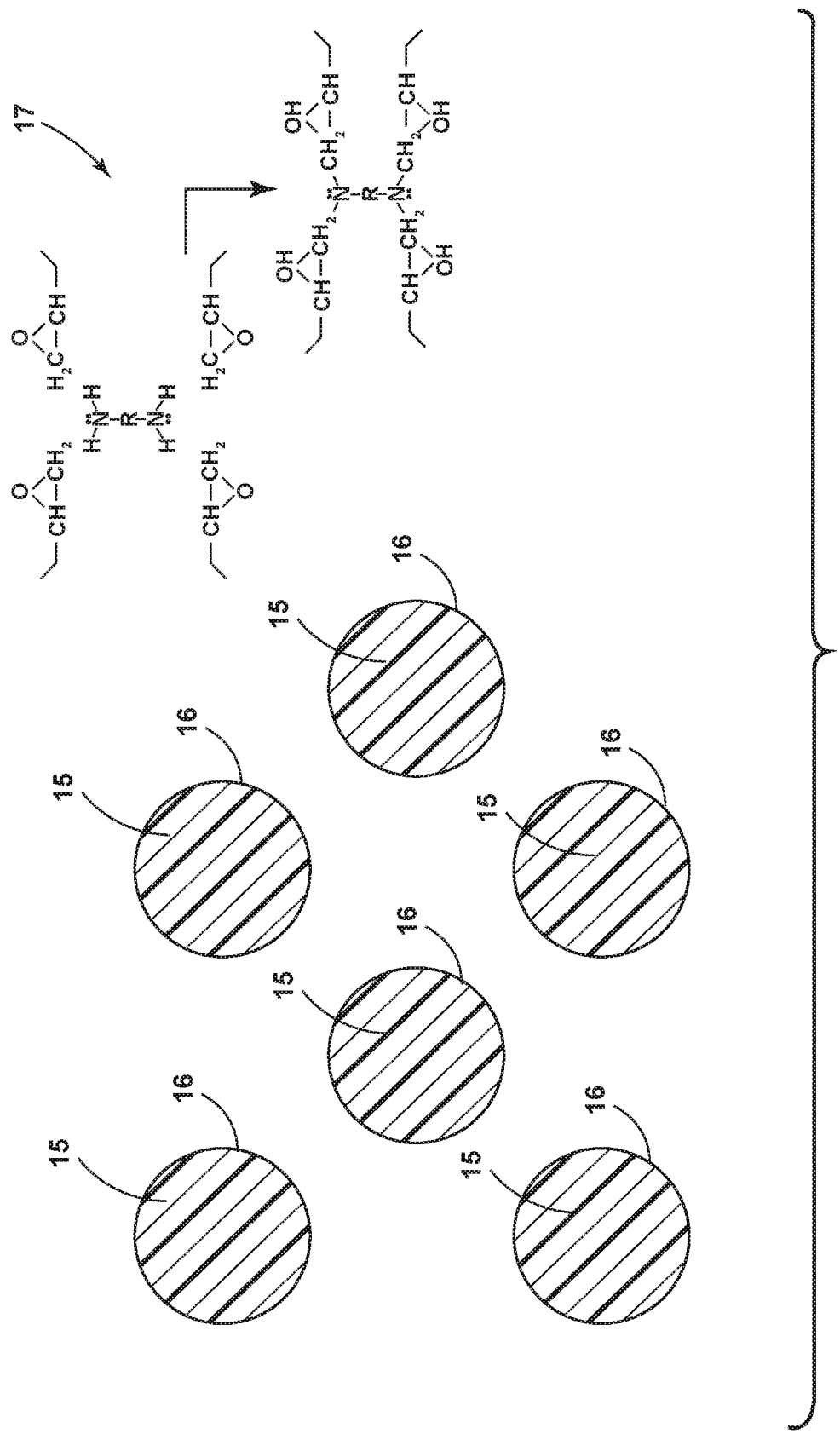
FIG. 2 is a schematic view showing formation of epoxy micro particles.

With reference to FIG. 2, epoxy particles 15 may be formed according to known processes. The outer surfaces 16 of the epoxy particles 15 may be spherical, or non-spherical. For example, the epoxy particles 15 may comprise spheres, elongated fibers or other suitable shape. The outer surfaces 16 are preferably formed to have an amine-enriched surface to form a chemical bond with polyimide-forming monomeric species (or similar species for alternative polymer chemistries), as described in more detail below. During formation of the epoxy particles 15, the ratio of diamine hardener to epoxy monomer (amine to epoxy, or a/e ratio) may be adjusted to provide free amine groups on the particle surface 16. In general, effective a/e ratios in the epoxy micro particles may range from about 1.0 to about 1.4. However, it will be understood that a/e ratios outside of this range may also be utilized if required for particular application. Also, it will be understood that the sizes of the epoxy particles 15 may be varied as required. The reaction 17 for forming epoxy particles 15 is generally known.

Figure 3:
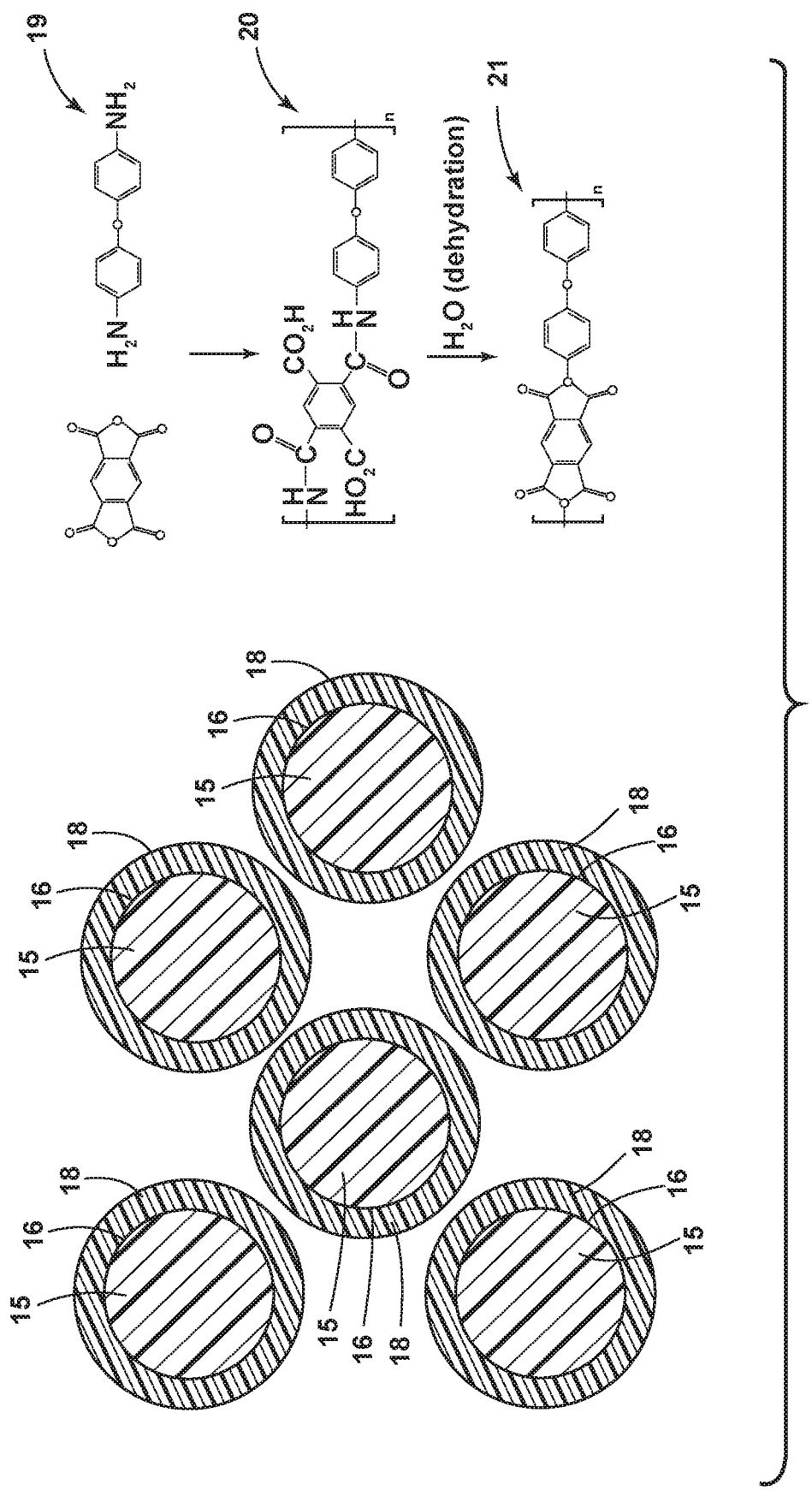
FIG. 3 is schematic view showing epoxy micro particles coated with a polyimide.

With reference to FIG. 3, the epoxy particles 15 are then coated with a polyimide material to form a polyimide shell 18. The polyimide shell 18 may be synthesized (steps 19-21) in a solution including the epoxy particles 15 whereby the epoxy particles 15 are coated with the polyimide polymer 18.

Figure 4:
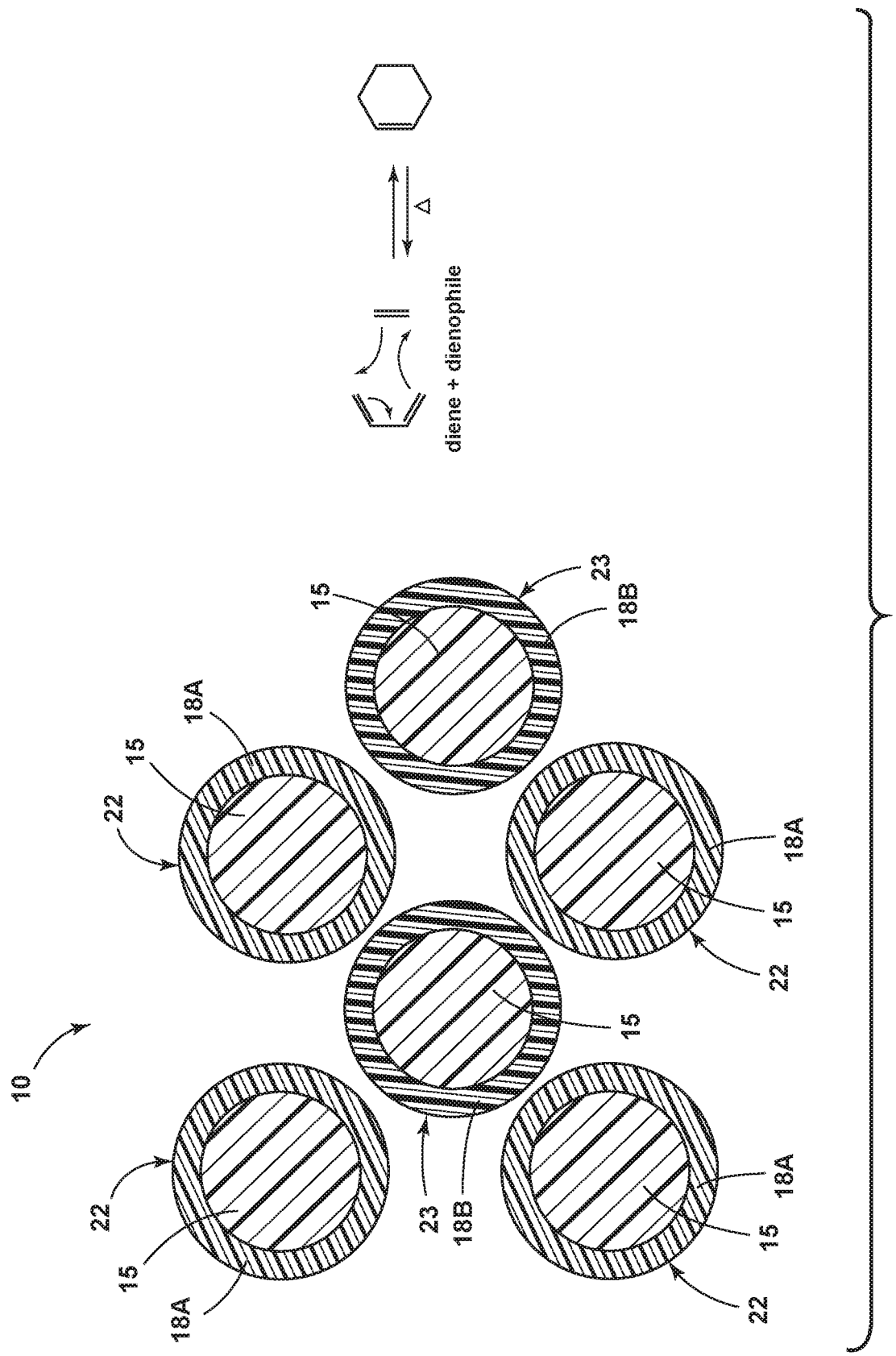
FIG. 4 is a schematic view showing epoxy particles coated with dienophile polyimides and epoxy particles coated with diene polyimides.

With further reference to FIG. 4, the polyimide shells preferably include shells 18A having a diene and polyimide shells 18B having a dienophile to form first polymer particles 22 having a first click functional feature and second polymer particles 23 having a second click functional feature. The type A (first) and type B (second) polyimide shells 18A and 18B, respectively, may incorporate a Diels-Alder click functional feature.

Figure 5:
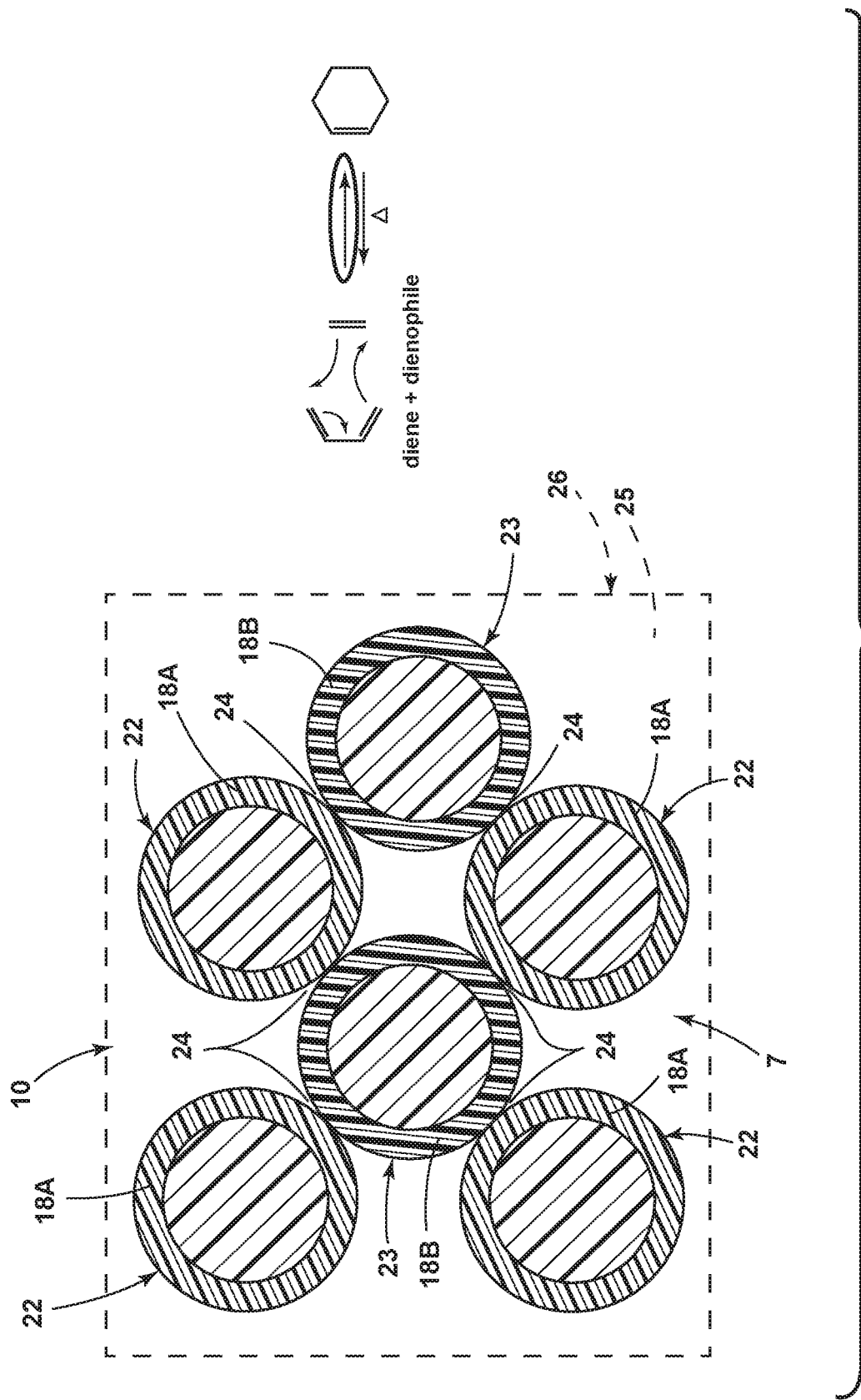
FIG. 5 is a schematic view of a polymer structure having click-bonded outer shells.

With further reference to FIG. 5, the first and second polymer particles 22 and 23 may be mixed together in a specified ratio and heated to a temperature sufficient to release the click bonding between the particles, and the particles 22 and 23 may then be formed into a desired shape with contact points or regions 24 between adjacent particles 22 and 23. The mixture 10 may then be cooled to cause click bonding at contact regions 24 to form a rigid structure having a desired shape. The mixture 10 may be positioned in a cavity 25 of a mold tool 26 to thereby form the mixture 10 into the desired shape prior to cooling to actuate click bonding at contact regions 24. The polymer material of the polymer shells 18A and 18B preferably has a glass transition temperature Tg that is sufficiently low to permit some deformation of the polymer shells 18A and 18B at contact points or regions 24 prior to cooling/click bonding. In general, the melting temperature of the polymer shells 18A and 18B may be selected to have a melting temperature that is above the temperature required for click bonding to thereby enable heating of mixture 10 to a temperature at which the polymer shells 18A and 18B is above the glass transition temperature Tg, but below the melting temperature, but also sufficiently high to release the click bonds between the first and second polymer particles 22 and 23.

Figure 6:
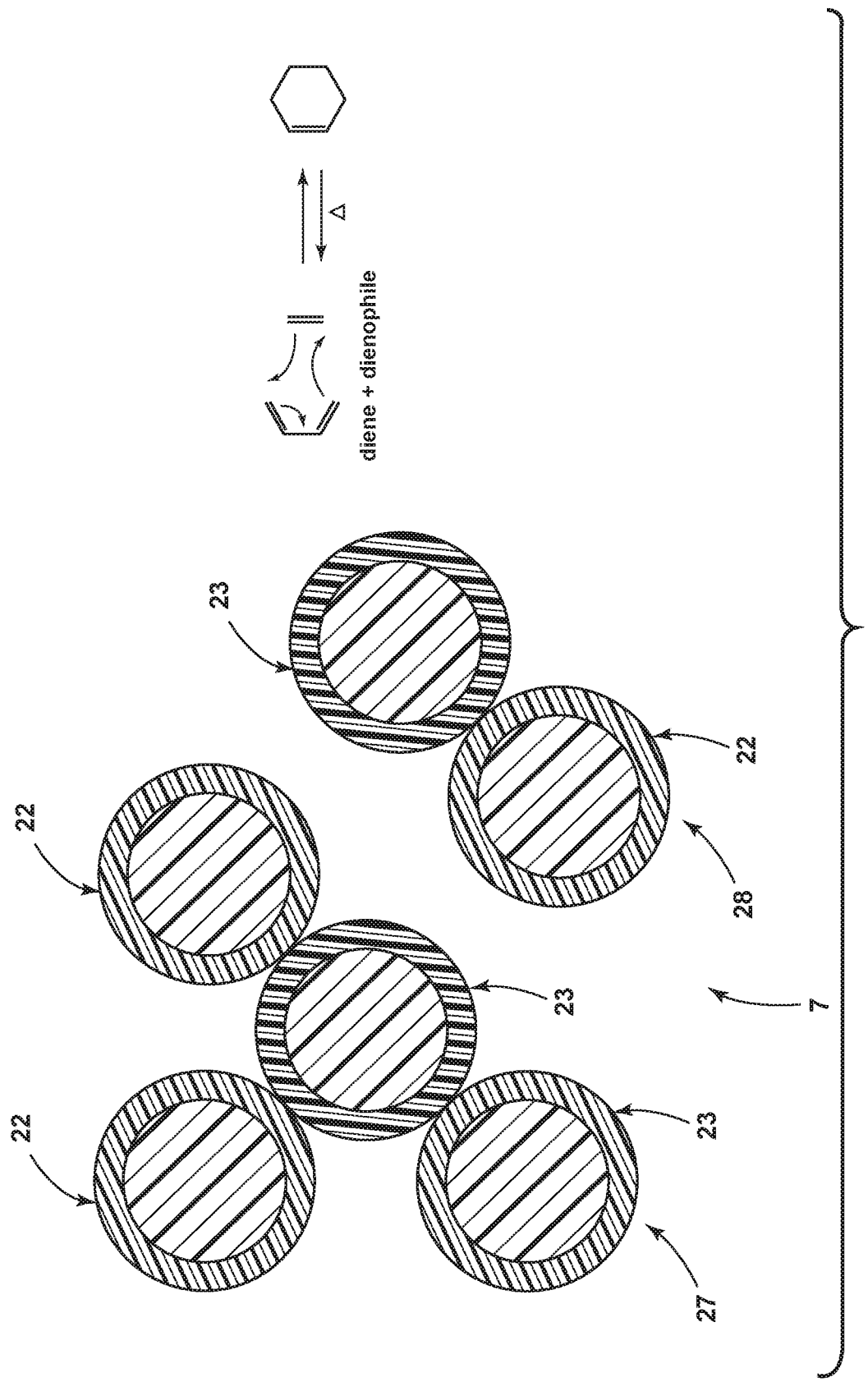
FIG. 6 is a schematic view showing the particles of FIG. 5 after separated.
Figure 7:
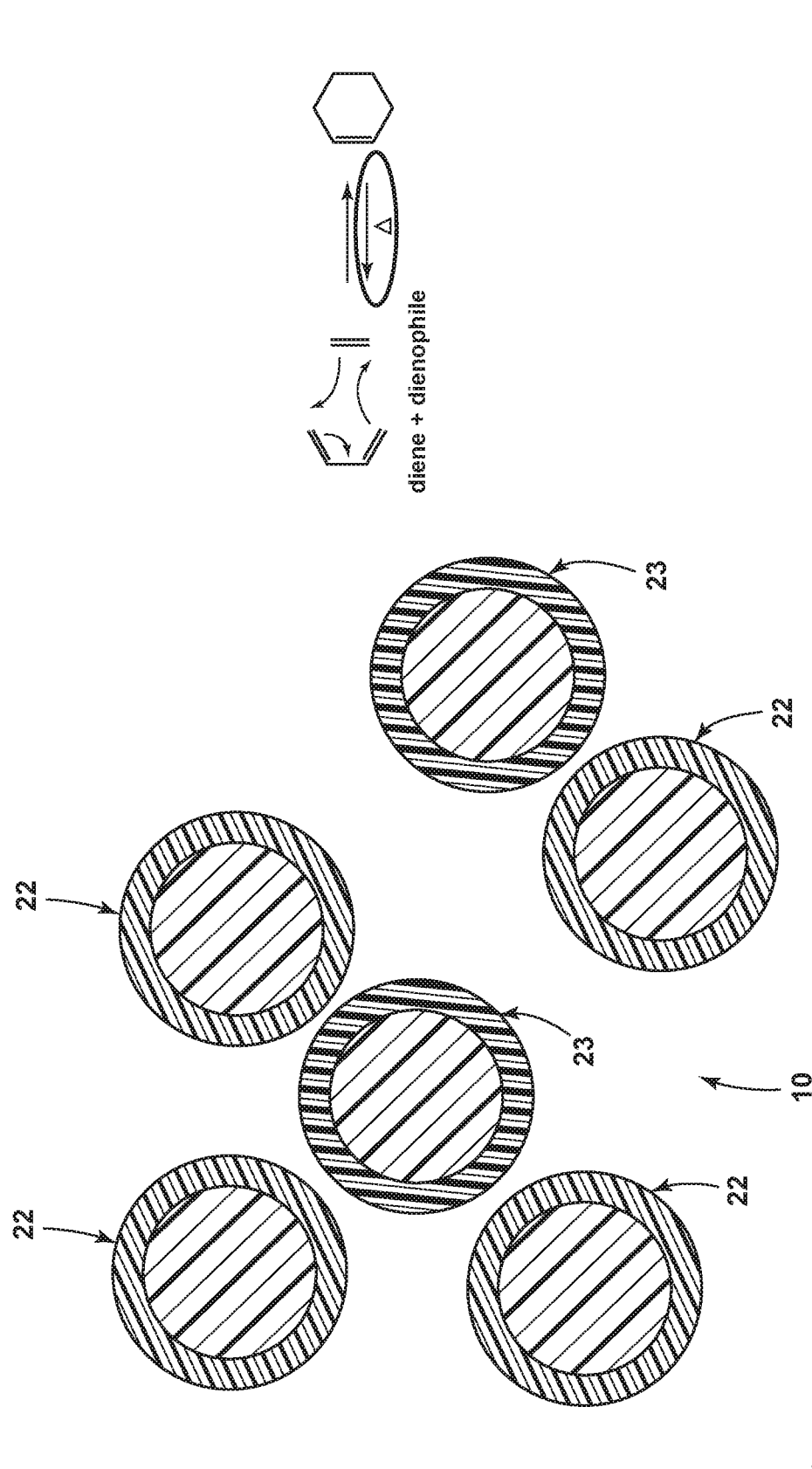
FIG. 7 is a schematic view showing the particles after the click bond is released to form feedstock.

With further reference to FIG. 6, the structure 7 may be used and/or broken into, for example, first and second portions 27 and 28. It will be understood that FIG. 6 is schematic in nature, and the structure 7 may be broken into multiple parts after use if required for a particular application. With reference to FIG. 7, the structure 7 (or portions 27, 28, etc. of structure 7) may be heated to release the click bonds and the first and second polymer particles 22 and 23 are separated (see also step 1F, FIG. 1). The individual particles 22 and 23 may be separated by applying sonication to, for example, a container in which the mixture 10 is retained to thereby physically separate the particles 22 from the particles 23. It will be understood that other separating processes may be utilized. For example, if the particles 22 and 23 have a different size, the particles may be separated by straining through a medium having openings with sizes that only permit one of the particles 22 or 23 to pass therethrough.

Figure 8:
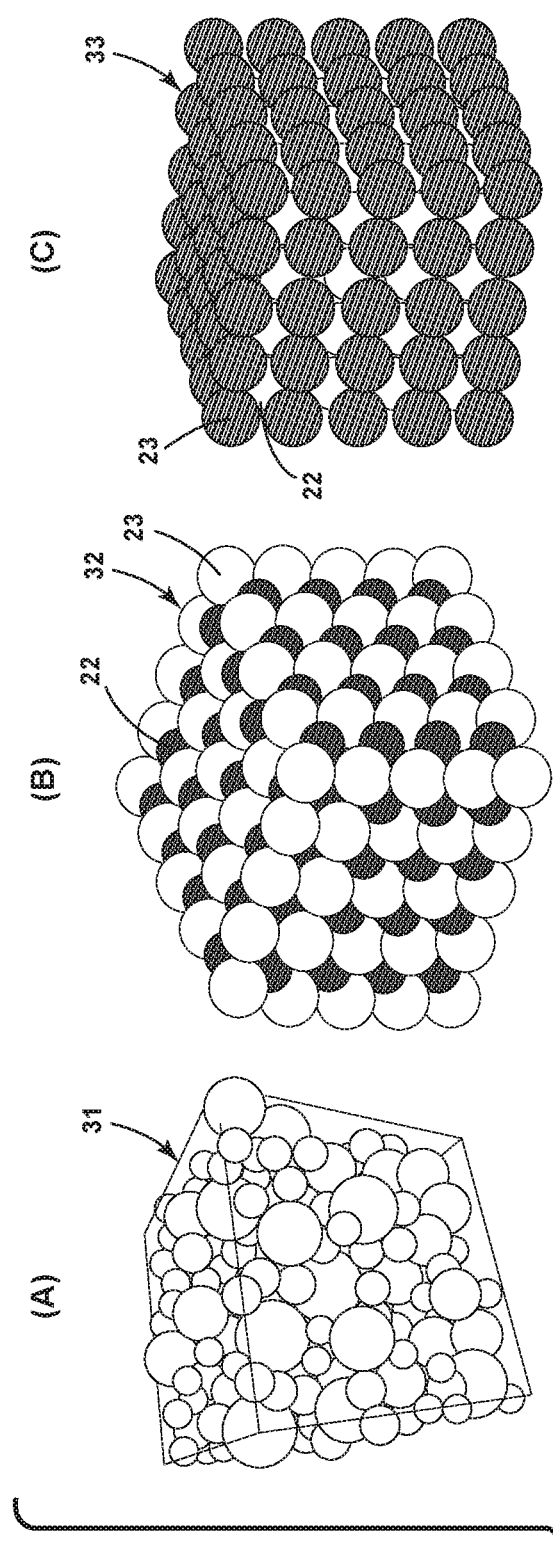
FIG. 8 is a schematic view showing crystal structures of the polymer particles.

With further reference to FIG. 8, the sizes and numbers of the first and second polymer particles 22 and 23 may be selected to provide a random dense packed structure 31. Alternatively, the particles may be sized to provide a cube lattice structure 32 that generally corresponds to the lattice structure of sodium chloride crystals. Alternatively, the particles 22 and 23 may have sizes that provide a crystal structure 33 that is substantially similar to a cesium chloride crystal structure. In general, a random dense packing arrangement 31 may have a density of about 60 to about 63%, and the size ratio of the particles 22 and 23 may be about 0.14. The crystal structure 32 may have a density of about 79%, and a size ratio of about 0.41. The crystal structure 33 may have a density of about 73%, and a size ratio of about 0.73. It will be understood that the structure 7 may utilize other crystal structures, and the size ratios and densities above are merely examples of crystal structures according to one aspect of the present disclosure.

The present disclosure provides in-space reusable materials that may be utilized for, for example, secondary structures of an exploration vessel, such as the Lunar Orbital Platform-Gateway or in support of ARTEMIS missions. The polymer structure 7 may be fabricated from reversible assembling materials that may be repurposed for other mission needs once the utility has been fully realized. This is achieved through reducing the recycled polymer component 7 (e.g. a shelf surface) to a feedstock material through heating and separation. The feedstock, when confined in a mold environment, retains the mold shape yielding a new component. The process may utilize a digitally reconfigurable mold which enables fabrication of multiple geometries from a single mold. These molds utilize a solid surface with a multi-point surface consisting of actuating pins to enable changes in geometry as required to fabricate parts having virtually any desired shape.

The polyimides preferably have a relatively low glass transition temperature, Tg, to enable chain reorientation under relatively mild conditions. This enables the two functionalities involved in the click chemistry to interact in the consolidated part. These two functionalities, a furan and a maleimide, can be integrated into the polymer chain as a functionality within the polymer backbone or as an end-group depending on the functionalization of the species.

The process and materials of the present disclosure are not limited to space missions and other such applications. For example, various temporary articles (structural, decorative, etc.) may be made utilizing the polymers and processes described above, and reassembled after the original polymer structure has served its original purpose.

What is claimed is:

1. A method of recycling a polymer structure, the method comprising:
   converting a first polymer structure comprising particles that are bonded to one another by chemical click bonds to form a first shape into feedstock particles by breaking the click bonds;
   forming the feedstock particles into a second shape;
   chemically click bonding the feedstock particles together to form a second polymer structure having a second shape.

2. The method of claim 1, wherein:
   breaking the click bonds includes heating the particles.

3. The method of claim 1, including:
   forming the first structure by causing first particles having dienes to chemically bond to dienophiles of second particles.

4. The method of claim 3, including:
   forming epoxy particles having surfaces;
   chemically bonding first polymers comprising dienes to the surfaces of the epoxy particles to form the first particles;
   chemically bonding second polymers comprising dienophiles to the surfaces of the epoxy particles to form the second particles.

5. The method of claim 4, wherein:
   the first and second polymers are formed from monomeric species chemically interacting with amine species on the epoxy particle surface such that the polymer is chemically bound.

6. The method of claim 5, wherein:
   the polymers are synthesized in solution with the epoxy particles whereby the polymers chemically bond to the epoxy particles.

7. The method of claim 6, wherein:
   the first and second polymers are synthesized separately and mixed together after synthesis to form a particle mixture comprising first and second particles.

8. The method of claim 6, wherein:
   the epoxy particles have an amine-enriched surface that chemically bonds to the polymer molecules.

9. The method of claim 8, wherein:
   the first polymer structure is formed by heating the particle mixture to break click bonds between the first and second particles;
   forming the particle mixture to a first shape, and cooling the formed particle mixture to cause click bonding of the first and second particles.

10. The method of claim 9, wherein:
    the particle mixture is heated to a temperature that is greater than a glass transition temperature of the first and second polymers, but below a melting temperature of the first and second polymers.

11. The method of claim 10, including:
selecting a lattice structure from a group consisting of a cubic lattice structure or a random lattice structure;
forming the first and second particles to have first and second sizes providing a size ratio of the selected lattice structure.

12. The method of claim 11, wherein:
the size ratio is about 0.41 or about 0.73;
the particles of the first polymer structure have a cubic lattice structure.

13. The method of claim 1, wherein:
the click bonding comprises a Diels-Alder reaction.

14. The method of claim 4, wherein:
the epoxy particles have spherical outer surfaces.

15. A recyclable polymer structure comprising:
a plurality of first polymer particles having a first chemical click bonding functionality;
a plurality of second polymer particles having a second chemical click bonding functionality;
and wherein the first and second polymer particles are click-bonded together to form a rigid structure that can be converted to feedstock by releasing the click bonds.

16. The recyclable polymer structure of claim 15, wherein:
the first particles comprise dienes;
the second particles comprise dienophiles that are chemically bonded to the dienes.

17. The recyclable polymer structure of claim 16, wherein:
the first and second particles comprise polyimide shells bonded to epoxy cores.

18. A method of making a recyclable polymer structure, the method comprising:
forming first polymer particles having an exterior surface with a first click-bonding functionality;
forming second polymer particles having an exterior surface with a second click-bonding functionality;
mixing the first and second polymer particles to form a particle mixture;
forming the particle mixture into a first shape while the first polymer particles are not click-bonded to the second polymer particles;
causing the first polymer particles to click bond to the second polymer particles to form a structure having the first shape.

19. The method of claim 18, including:
forming epoxy particles having an amine-enriched outer surface;
forming first polymer particles by synthesizing a first polymer having dienes in a solution with at least some of the epoxy particles;
forming second polymer particles by synthesizing a second polymer dienophiles in a solution with at least some of the epoxy particles;
forming the particle mixture into the first shape while the particle mixture is heated to release the click bonds;
followed by cooling the particle mixture to activate the click bonds.

* * * * *